Oct. 10, 1967    C. E. LOETEL ETAL    3,346,246
COOLING TOWER FILL ASSEMBLY OF FORAMINOUS SHEET MATERIAL
Filed Jan. 25, 1965    3 Sheets-Sheet 1

INVENTORS.
Charles E. Loetel
Howard A. Shryock
BY
Avey, Schmidt, Johnson & Avey
ATTORNEYS.

Oct. 10, 1967 — C. E. LOETEL ETAL — 3,346,246
COOLING TOWER FILL ASSEMBLY OF FORAMINOUS SHEET MATERIAL
Filed Jan. 25, 1965 — 3 Sheets-Sheet 2

INVENTORS.
Charles E. Loetel
Howard A. Shryock
BY
Hovey, Schmidt, Johnson & Hovey
ATTORNEYS.

Oct. 10, 1967  C. E. LOETEL ET AL  3,346,246
COOLING TOWER FILL ASSEMBLY OF FORAMINOUS SHEET MATERIAL
Filed Jan. 25, 1965  3 Sheets-Sheet 3
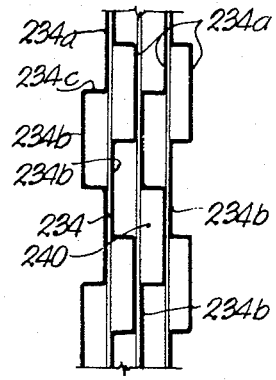
Fig. 10.
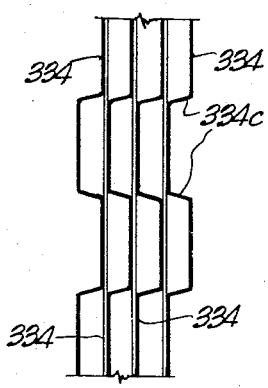
Fig. 11.
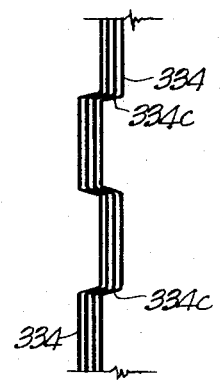
Fig. 12.
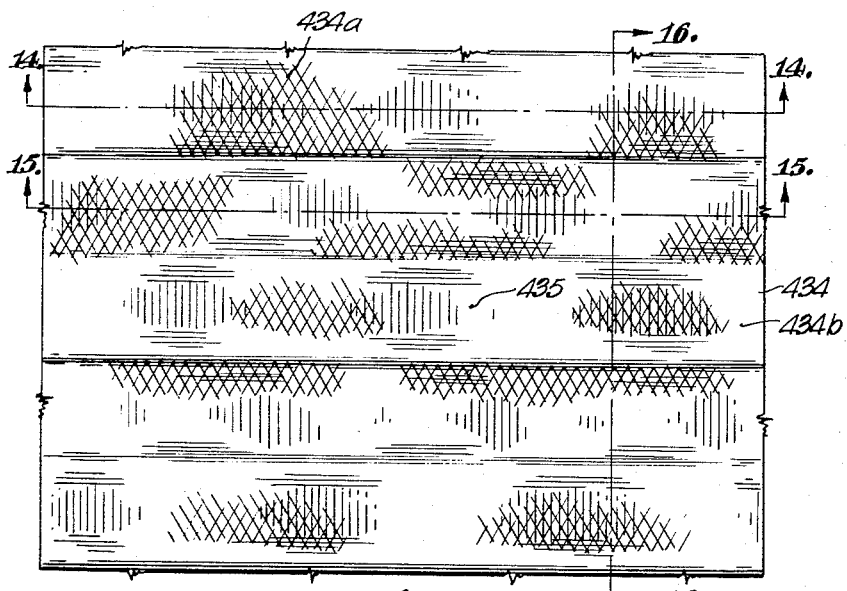
Fig. 13.
Fig. 16.
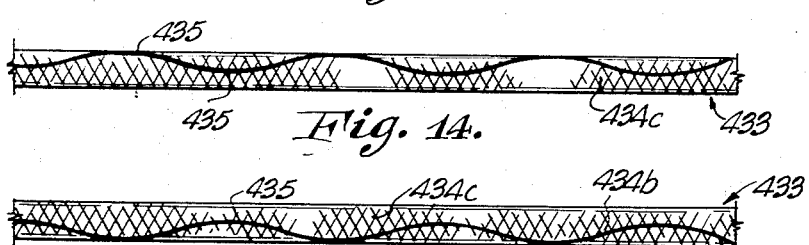
Fig. 14.
Fig. 15.
INVENTORS.
Charles E. Loetel
Howard A. Shryock
BY
Hovey, Schmidt, Johnson & Hovey
ATTORNEYS.

United States Patent Office 3,346,246
Patented Oct. 10, 1967

3,346,246
COOLING TOWER FILL ASSEMBLY OF
FORAMINOUS SHEET MATERIAL
Charles E. Loetel, Overland Park, and Howard A.
Shryock, Mission, Kans., assignors to The Marley
Company, Kansas City, Mo., a corporation of
Delaware
Filed Jan. 25, 1965, Ser. No. 427,751
10 Claims. (Cl. 261—103)

This invention relates to improvements in water diffusion units for cooling towers and, more specifically, to an improved diffusion unit permitting a smaller volume cooling tower to be employed without a corresponding reduction in cooling capacity.

Cooling towers in common use employ a hot water distributor which discharges the water to be cooled onto a fill assembly for gravitation therethrough to a cold water collection basin. A blower moves the ambient air through the fill assembly at a relatively high velocity to cause cooling of the water by evaporation. In order to impede the flow of water through the assembly and cause an increase in the surface area thereof exposed to air contact, conventional practice has been to employ fill assemblies formed of a number of vertically spaced, horizontal rows of wooden slats.

Although wooden slat fill assemblies have proven to be satisfactory over the years, they are combustible when dry and subject to attack by certain chemical agents as chlorine. Fill assemblies formed of slats also are relatively expensive from a cost and fabrication standpoint. Although the water passing over the slats is broken into droplets as it gravitates from one horizontal row to the next lower row and thus the surface area of the water subjected to air contact is somewhat increased, the efficiency of this arrangement is limited because of the thickness of the film of the water while actually flowing over the slat surfaces or in the form of relatively thick droplets. Structure for breaking the water up into very small droplets is not satisfactory because of the problem of drift and water loss. For example, small water droplets tend to become entrained in the airstream, thereby causing excessive drift of the water as it passes through the fill assembly unless air velocities of no greater than approximately 450 feet per minute are utilized.

It is, therefore, an important object of this invention to provide a water diffusion unit for a cooling tower capable of operation at a higher air flow velocity therethrough than with heretofore available fill assemblies while simultaneously presenting minimum impedance to the air flow for more efficient utilization of tower space and without an attendant undesirable pressure drop as the airstream passes through the fill to the outlet of the cooling tower or excessive drifting or loss of water.

Another important object of the instant invention is to provide a water diffusion assembly which, when the heated water flows thereover, will cause the water to present a greater surface area per unit of volume of the water diffusion assembly than has been attainable through use of wooden slat fills of the prior art.

Still another object of this invention is to provide a water diffusion assembly which is relatively resistant to deterioration and which has sufficient structural rigidity to form a self-supporting, monolithic structure.

A further object of the instant invention is to provide a water diffusion assembly in which a high degree of wetting or loading thereof is obtainable even at relatively higher air velocities without surging of the water or entrainment of water droplets in the airstream.

Additionally, it is a specific object of this invention to provide a water diffusion assembly which may be utilized with airstream velocities as high as approximately 900 feet per minute without surging or excessive entrainment of the water in the airstream and which, even when used at such velocities, will cause the water to be distributed through the fill in the form of a relatively thin film, thereby exposing the maximum water surface to the high velocity stream. The achievement of this object by the instant invention enables the volume of the cooling tower to be substantially smaller for the same cooling capacity and, in some instances, reduces the tower volume to one-half of the volume required for the same cooling capacity as compared with cooling towers of the prior art.

Another important object of the instant invention is to provide novel water diffusion structure having undulating surface defining the air passages to thereby create turbulence in the air flow for enhancing the cooling efficiency of the unit through better working of the air through the water.

Other objects will become apparent as the detailed description proceeds.

In the drawings:

FIG. 10 is a view similar to FIG. 4 showing a modified form of water-diffusion assembly;

FIG. 11 is a view similar to FIG. 4 illustrating another form of water-diffusion assembly;

FIG. 12 is a view similar to FIG. 11 showing the sheets in nested relationship to facilitate packing thereof for shipment;

FIG. 13 is a fragmentary, detailed view of a portion of a modified form of foraminous sheet;

FIG. 14 is a sectional view taken along line 14—14 of FIG. 13;

FIG. 15 is a sectional view taken along line 15—15 of FIG. 13; and

FIG. 16 is a sectional view taken along line 16—16 of FIG. 13.

Figure 1:
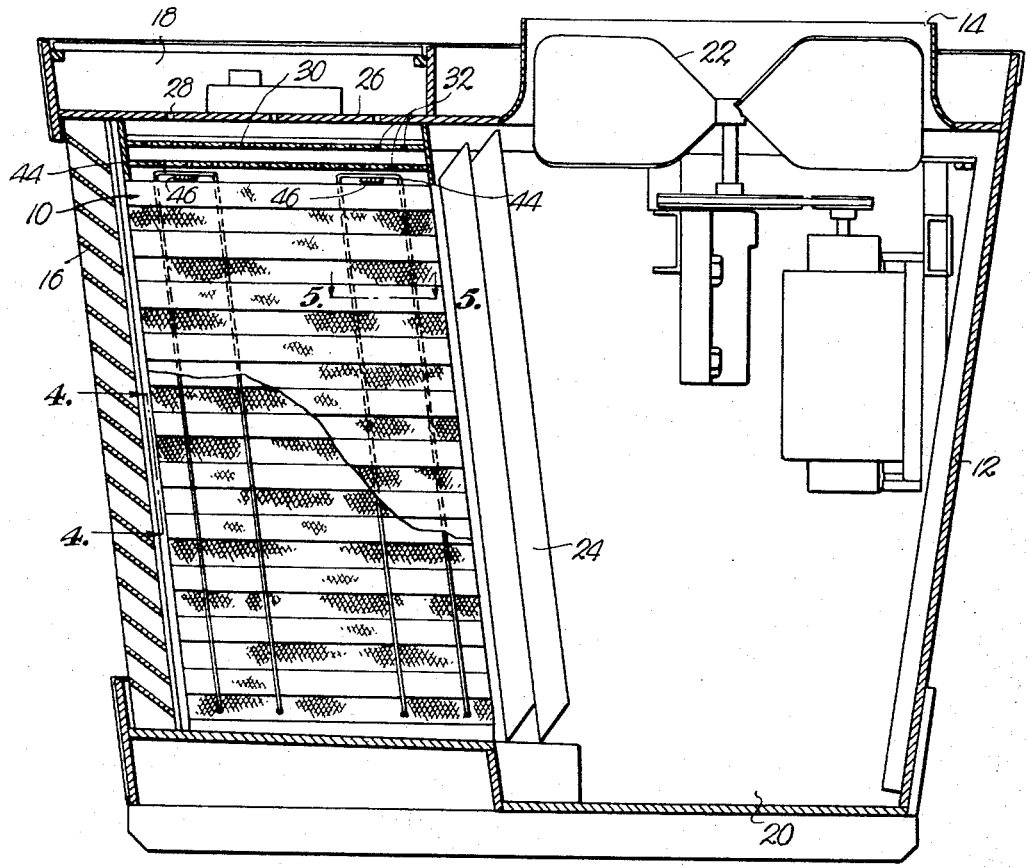
FIGURE 1 is a vertical sectional view of a cross flow type cooling tower showing the internal construction thereof and embodying an improved water diffusion assembly.

FIGURE 1 shows a cross flow cooling tower of conventional design except for the provision of water diffusion unit or assembly 10 of the instant invention. The tower comprises a casing 12 having a discharge ring or air outlet 14, air inlet louvers 16, a hot water distributor 18, and a cold water collection basin 20. A blower 22 is disposed in casing 12 with the fan blades thereof located in discharge ring 14, the blades being driven in a direction to draw air into casing 12 through inlet louvers 16 and exhaust such air through the discharge ring 14. Manifestly, air drawn into the tower passes horizontally through fill assembly 10 and drift eliminators 24 in its path of travel through the chamber formed by casing 12 to discharge ring 14.

The hot water distributor 18 comprises a base 26 having a number of orifices 28 therein, and two horizontal rows of vertically offset distributor slats 30 presenting elongated spaces therebetween. In this manner, hot water from the operating system pumped into distributor 18 is allowed to gravitate downwardly onto fill assembly 10 and, at the same time, is dispersed or distributed over a horizontal area of the same size as the top of assembly 10.

With reference to FIGS. 2–5, as well as FIG. 1, it may be seen that assembly 10 comprises a plurality of vertical panels 33 defined by foraminous sheets 34 of serpentine configuration as viewed in a vertical plane. Each sheet comprises a number of elongated, first foraminous segments 34a in aligned relationship, and a series of generally aligned second foraminous segments 34b located in offset, staggered relationship with reference to adjacent first segments 34a. Horizontally disposed, foraminous sections 34c interconnect the lowermost margin of each segment 34a and the uppermost margin of a proximal segment 34b offset therefrom in one direction as well as the respective lowermost margin of the corresponding segment 34b with the uppermost margin of the segment 34a next below the first segment 34a mentioned above. The opposed major surfaces presented by each of the segments 34a and 34b and sections 34c are in substantial parallelism with the path of travel of the air through the cooling chamber of casing 12 with each section 34c having a transverse width less than one-half of the vertical height of adjacent segments 34a and 34b. It may be noted that inlet louvers 16, eliminators 24, and the fill assembly 10 are inclined with respect to the vertical to compensate to a certain extent for the normal angle of water drift caused by the high velocity airstream.

Figures 4, 5:
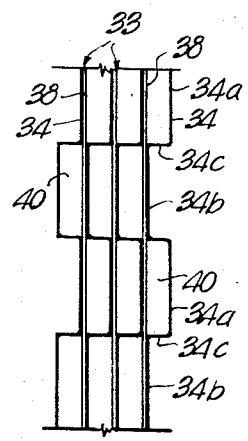
FIG. 4 is a sectional view taken along line 4—4 of FIG. 1.
FIG. 5 is a sectional view taken along line 5—5 of FIG. 1.

The various sheets of fill assembly 10 are formed into a monolithic, self-supporting unit through the use of a number of elongated, transversely relatively thin elements 38 which extend between adjacent sheets preferably at an angle of inclination equal to the angle of inclination of the inlet louvers 16 and eliminators 24, as is clear in FIG. 1. Each element 38 may comprise strands of glass fibers coated with a bonding agent such as a polyester which is initially in the liquid state during fabrication of the assembly 10. Thus, when the sheets 34 are formed of synthetic resin material, the polyester coating is permitted to cure in place upon assembly of the sheets to thereby bond each strand 38 to every other segment 34a and 34b of each sheet 34 adjacent thereto. Manifestly, if the elements 38 and sheets 34 are made from other materials, they may be secured together with other suitable fastening means. This structural configuration and the interrelation between the strands 38 and the sheets 34 of the assembly 10 may be best seen by reference to FIG. 4. It should be noted that FIG. 4 is a view looking horizontally inwardly into the assembly 10 from the air inlet side thereof; thus, it may be seen that the segments 34a and 34b, and offset sections 34c of adjacent sheets 34, form horizontally extending, vertically rectangular air flow passages 40 of substantial size for the airstream.

The sheets of fill assembly 10 are preferably formed of expanded aluminum, stainless steel or hot-dipped galvanized steel, but it is to be understood that a thermoplastic synthetic resin such as expanded polyvinyl chloride may be utilized. Additionally, organic or inorganic paper impregnated with a stiffening agent such as a natural or synthetic resin or an inorganic cement formed into the required configuration may be employed for fabrication of the water diffusion assembly. In the preferred construction, an initially flat sheet having rows of relatively offset slits therethrough is expanded by stretching the sheet transversely of the slits therein. When polyvinyl chloride material is used, it is stretched while in a heated condition followed by formation of the sheet into the serpentine configuration. Upon cooling of the sheets they remain in the configuration shown.

Figure 2:
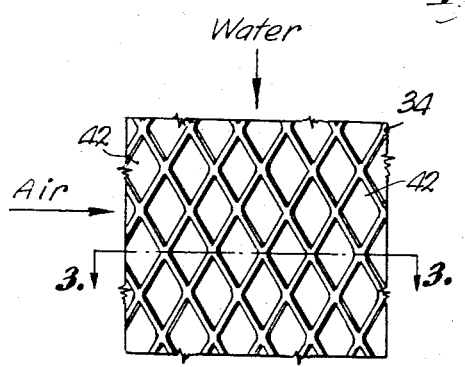
FIG. 2 is a fragmentary, detailed view of a portion of one of the foraminous sheets forming a part of the water diffusion assembly utilized in the cross flow cooling tower of FIG. 1, the directions of air water flow being illustrated by the arrows.
Figure 3:
FIG. 3 is a sectional view taken along line 3—3 of FIG. 2.

The slits thus become diamond-shaped openings defined by strips of the sheets as indicated by the numeral 42 in FIG. 2. The longitudinal axes of openings 42 in segments 34a and 34b are thereby upright and thus extend in substantially the direction of water flow through the fill assembly.

The mesh so formed spreads the water over a broad surface area as it gravitates through the fill assembly and causes formation of the water into a moving film. This effect is produced by the strips of sheet 34 defining diamond-shaped openings 42 because, it is believed that as the water gravitates downwardly on segments 34a and 34b and reaches the upper extremity of a particular opening, it is caused to spread outwardly and bridge the opening as the opening increases in width upon downward movement of the water. In this manner, the natural surface tension of the flowing water is utilized to cause the water to draw itself into a thin film, the thinnest portion of the film being at the center of each opening 42, the center, of course, being the widest point of the opening. As the film gravitates from one horizontal row of openings 42 to the next lower row, the film increases in thickness as the water tends to re-form at the lower extremities of the openings, but the next row of openings again causes spreading and film formation. Additionally, it may be seen in FIG. 2 that adjacent horizontal rows of openings 42 are offset so that each opening 42 extends upwardly and downwardly between adjacent pairs of openings thereabove and therebeneath.

Since assembly 10 is self-sustaining, it may be readily supported in the cooling chamber by joining the upper ends of strands 38 as shown in FIG. 1 to provide two rows of suspension loops 44. The two rows of loops 44 may then be located in overlying relationship to cross members 46 rigid with casing 12.

Figure 6:
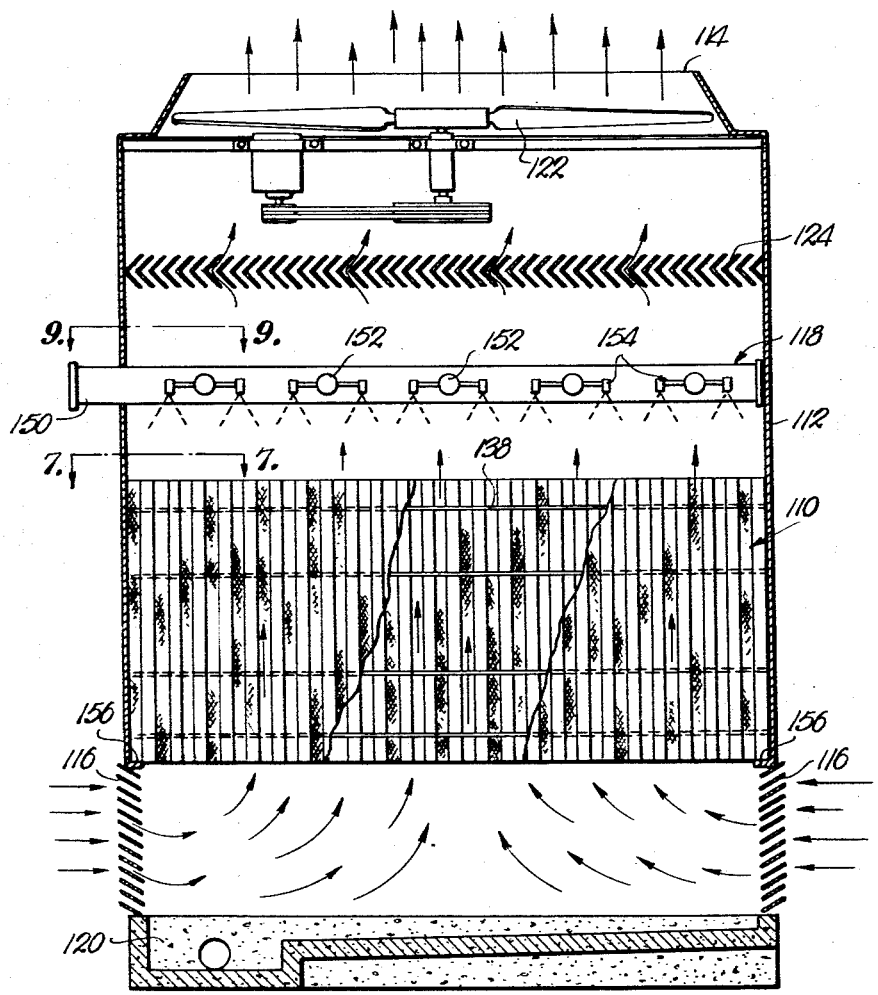
FIG. 6 is a vertical, sectional view of a counterflow type cooling tower showing the internal construction thereof and embodying a water diffusion assembly of the type illustrated in FIGS. 1–5 but specifically adapted for use in a counterflow tower.

Reference is now made to FIGS. 6–9 which show the installation of the instant invention in a counterflow cooling tower. The over-all tower is shown in FIG. 6, conventional components thereof of identical function to that as shown in FIG. 1 and described above being designated by the same reference characters preceded by the numeral "1." A primary difference in the structure of the two towers is in the hot water distributor 118 which employs an inlet pipe 150 provided with a number of manifolds 152 which carry a battery of discharge nozzles 154. These nozzles 154 direct water downwardly onto the assembly 110 in direct opposition to the upward flow of air through the tower caused by blower 122. The arrows in FIG. 6 illustrate the movement of the airstream.

Figures 7, 8, 9:
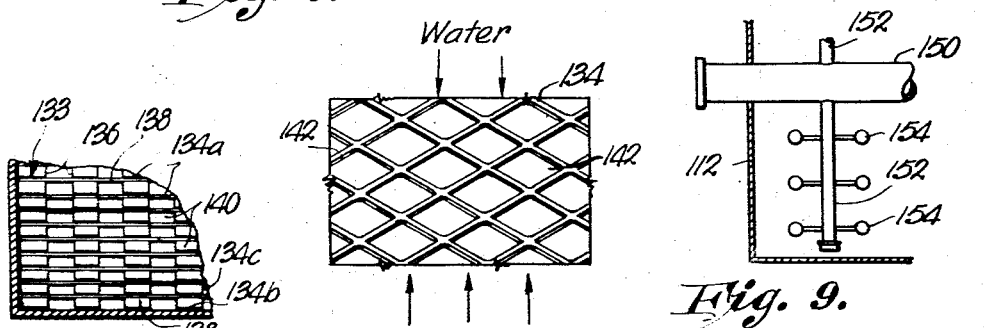
FIG. 7 is a sectional view taken along line 7—7 of FIG. 6.
FIG. 8 is a view similar to FIG. 2 except that the disposition of the sheet and the directions of water and air flow for the counterflow cooling tower of FIG. 6 is shown.
FIG. 9 is a sectional view taken along line 9—9 of FIG. 6.

A study of FIGS. 6–8 reveals that the serpentine configuration of the sheets 134 forming assembly 10 extends horizontally rather than vertically as in the crossflow tower of FIG. 1. Thus, the various passages 140 defined by the segments 134a and 134b and the offset sections 134c of the sheets 134 extend vertically and, therefore, the panels 133 presented thereby are in substantial parallelism with the path of the moving airstream. It will be appreciated, however, that the diamond-shaped openings 142 of assembly 110, even though located with the minor axes thereof disposed vertically, function in substantially the same manner as discussed hereinabove for fill assembly 10.

Strands 138 are employed to cause assembly 110 to present a monolithic, self-supporting unit in the same manner as discussed previously during the description of the construction of assembly 10. The only essential differences between assembly 10 and assembly 110 are that assembly 110 extends horizontally across the cooling chamber and presents vertical air passages rather than the converse, and the angle of drift compensated for by the inclination of fill assembly 10 is no longer a problem in the counterflow tower of FIG. 6 since the air flow and the water flow are in direct opposition. Strands 138 terminate at the left-hand and right-hand ends of fill assembly 110, the latter being supported by a pair of opposed ledges 156 which extend inwardly toward one another from casing 112.

The air flow resistance (or pressure drop) of the sheets constructed pursuant to this invention is less when the sheets are wet than when they are dry. This result is believed to be attributable to the fact that the sheets have a relatively rough surface configuration, thus presenting substantial resistance to flow of air thereover, whereas, when the sheets are wetted, the surfaces are much smoother and thus air flow thereover is not substantially impeded. This decrease in resistance to air flow is important in obtaining the high airstream velocities discussed earlier in this specification without sacrificing the efficiency of the tower.

Furthermore, during formation of sheets 34 and 134 from the vinyl or metallic material, the strips thereof presenting respective openings 42 and 142 are inclined slightly with respect to the faces of the sheets and thereby presenting additional serpentine flow path for the gravitating water.

Referring now to FIG. 10, it may be seen that each sheet 234 of foraminous material is formed so that the segments 234a are not aligned. Similarly, the segments 234b are also offset with respect to each other. The marginal edges of the proximal segments 234a and 234b of adjacent sheets 234 are disposed in mutually spaced relationship. Thus, the air flow passages 240 presented between adjacent sheets 234 are of irregular configuration and are of substantial size to accommodate a relatively large air flow.

The sheets 334 illustrated in FIGS. 11 and 12 are similar to the sheets 34 of FIG. 4. However, the sheets 334 are provided with angularly disposed sections 334c. This permits the sheets 334 to be nested as shown in FIG. 12, whereby the sheets can be packed for shipping and the like with a resulting conservation of a substantial space.

Referring now to FIGS. 13–16, the sheet 434 is similar to sheets 334. However, the segments 434a and 434b are provided with a plurality of transversely arcuate protuberances 435 which may be formed by bending or otherwise deforming the sheet 434. There are protuberances 435 extending the length of each segment and, as is clearly shown in FIGS. 14 and 15, the longitudinal axis of each protuberance extends generally perpendicular to the longitudinal axis of the respective segments 434a and 434b. It will be noted that each succeeding protuberance 435 of a segment projects in a direction opposite to the direction of projection of the preceding protuberance to present an undulating surface in each segment. Further, as shown in FIGS. 13, 14 and 15, the protuberances of each segment are disposed in offset relationship with respect to the corresponding protuberances of the adjacent segments.

It will be readily understood that the use of sheets 434 in the construction of water-diffusion assemblies causes turbulence in the airstream as the air flows along the undulating surfaces of the respective segments 434a and 434b. This enhances the cooling efficiency of the unit as a result of increased working of the air through the water in the diffusion assembly.

It is also to be understood that under certain conditions the water diffusion assembly may be tilted to a selected degree from the horizontal in a crossflow tower and with reference to the vertical in a counterflow tower to promote greater turbulence of air passing through the assembly. In a crossflow tower for example, tilting the assembly relative to the horizontal would permit variation of the angle of the air inlet and air outlet faces of the diffusion assembly for proper water loading and with more flexibility in design size of the package being possible. Furthermore, adjacent sheets of a water diffusion assembly may be located so that the longitudinal axes of the segments and sections thereof are disposed at an angle with respect to the corresponding longitudinal axes of the segments and sections of an adjacent sheet.

Having thus described the invention, what is claimed as new and desired to be secured by Letters Patent is:

1. In a crossflow cooling tower having a casing provided with an air inlet and an air outlet spaced therefrom for flow of air along a generally horizontal path therebetween, a water collection basin underlying the casing and hot water distribution structure above the basin whereby water from the structure gravitates through the airstream in intersecting relationship thereto and is collected in the basin, the combination with said casing, distribution structure and basin of:

a water diffusion unit located within the casing in said path of air and between the basin and said distribution structure for receiving hot water from the latter for gravitation therethrough, said unit including a plurality of upright, foraminous panels having opposed major surface areas located in substantially parallel relationship to the air flowing through the unit and serving to increase the surface area of the water exposed to said airstream as the water gravitates therethrough, said panels each having a plurality of upright rows of elongated, horizontal, transversely upright, foraminous segments in substantially coplanar relationship and a plurality of vertically spaced, horizontal, foraminous sections disposed in bridging relationship to the segments of adjacent upright rows thereof to maintain the latter in horizontally spaced relationship, the transverse width of each section being less than one-half of the corresponding transverse vertical height of each of the segments between vertically spaced sections.

2. A cooling tower as set forth in claim 1 wherein each of said panels has a series of strips arranged to present substantially diamond-shaped openings with the major axes thereof located in substantially perpendicular relationship to the path of air flow through the unit.

3. A cooling tower as set forth in claim 1 wherein each of the panels has a pair of upright rows of segments with successive segments of alternate rows being vertically staggered and wherein the segments of adjacent panels are vertically staggered.

4. A cooling tower as set forth in claim 1 wherein each of the panels has a pair of upright rows of segments with successive segments of alternate rows being in vertically staggered relationship.

5. A cooling tower as set forth in claim 4 wherein the segments of one row of each panel are proximal to the segments of the corresponding other row of an adjacent panel and wherein is provided connecting means joining proximal segments of adjacent rows thereof to increase the structural strength and integrity of the unit.

6. A cooling tower as set forth in claim 5 wherein said connecting means comprises a series of elongated elements bonded to the proximal segments of adjacent panels.

7. A cooling tower as set forth in claim 6 wherein each of said elements comprises a multifibrous strand of glass fibers coated with a bonding agent firmly adhering to the proximal segments of adjacent panels.

8. A cooling tower as set forth in claim 1, wherein each of said segments is provided with a plurality of transversely arcuate protuberances presenting an undulating surface in each segment.

9. A cooling tower as set forth in claim 8, wherein the longitudinal axis of each of said protuberances extends transversely with respect to the longitudinal dimension of the corresponding segment.

10. A cooling tower as set forth in claim 9, wherein the protuberances of each segment are disposed in offset relationship with respect to the corresponding protuberances of the adjacent segments.

(References on following page)

References Cited

UNITED STATES PATENTS

| | | |
|---|---|---|
| 2,892,509 | 6/1959 | Baker et al. |
| 2,971,750 | 2/1961 | Boling _____ 261—140 XR |
| 2,977,103 | 3/1961 | Smith et al. _____ 261—112 XR |
| 3,010,706 | 11/1961 | McWilliams _____ 261—94 XR |
| 3,084,918 | 4/1963 | Kohl et al. |
| 3,113,102 | 12/1963 | Schulze _____ 261—103 XR |
| 3,189,329 | 6/1965 | Smith et al. |
| 3,227,429 | 1/1966 | Renzi. |
| 3,232,865 | 2/1966 | Quinn et al. _____ 261—112 XR |
| 3,243,170 | 3/1966 | Ellis et al. _____ 261—94 |

FOREIGN PATENTS 973,746  10/1964  Great Britain.

HARRY B. THORNTON, *Primary Examiner.*

TIM R. MILES, *Examiner.*